May 31, 1955        H. E. LA BOUR        2,709,451
BALANCED DUPLEX VALVE HEAD AND SEAT MEMBER
Filed July 26, 1952        2 Sheets-Sheet 1
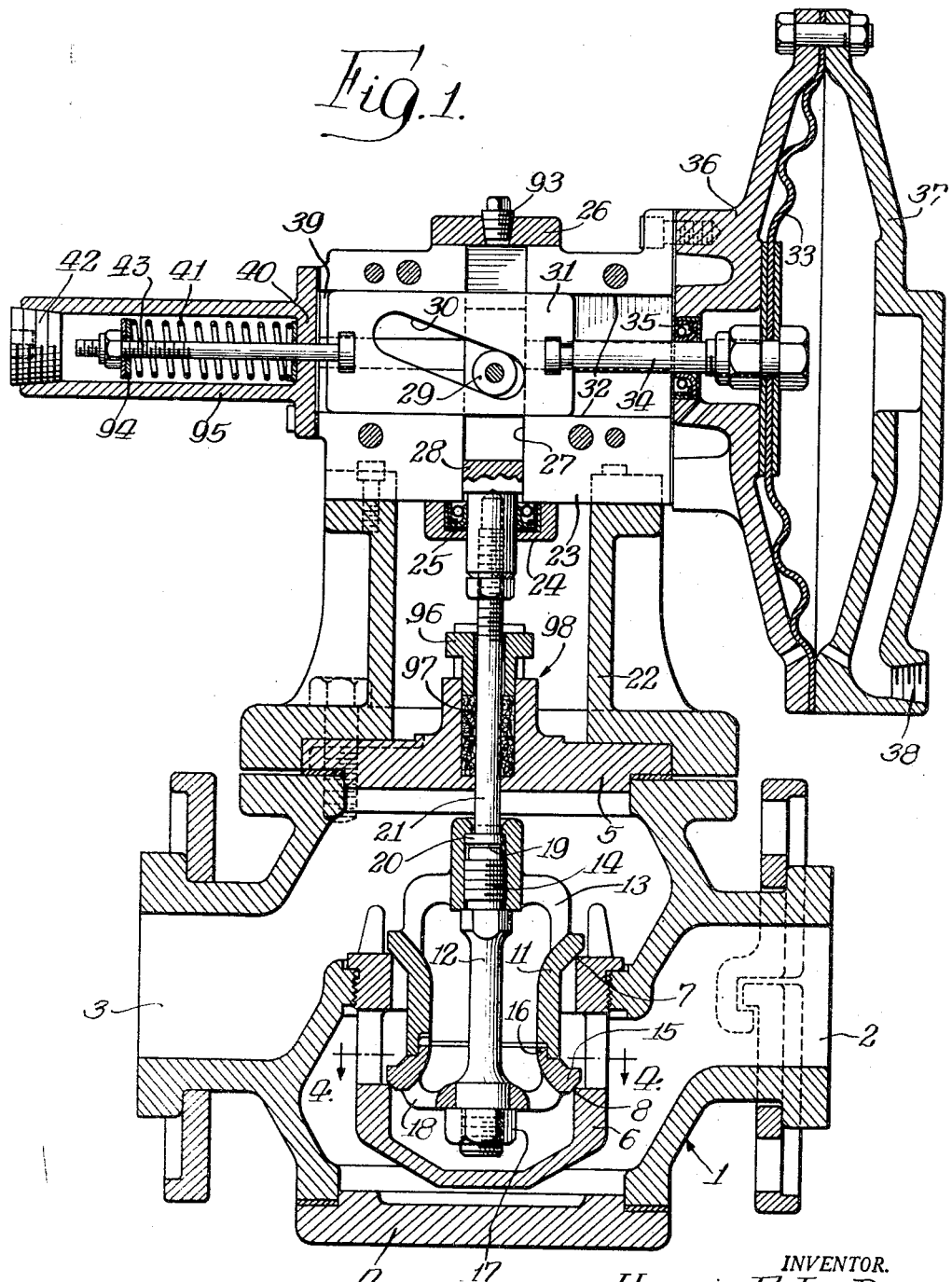
INVENTOR.
Harry E. La Bour,
BY
Attys.

May 31, 1955  H. E. LA BOUR  2,709,451
BALANCED DUPLEX VALVE HEAD AND SEAT MEMBER
Filed July 26, 1952  2 Sheets-Sheet 2
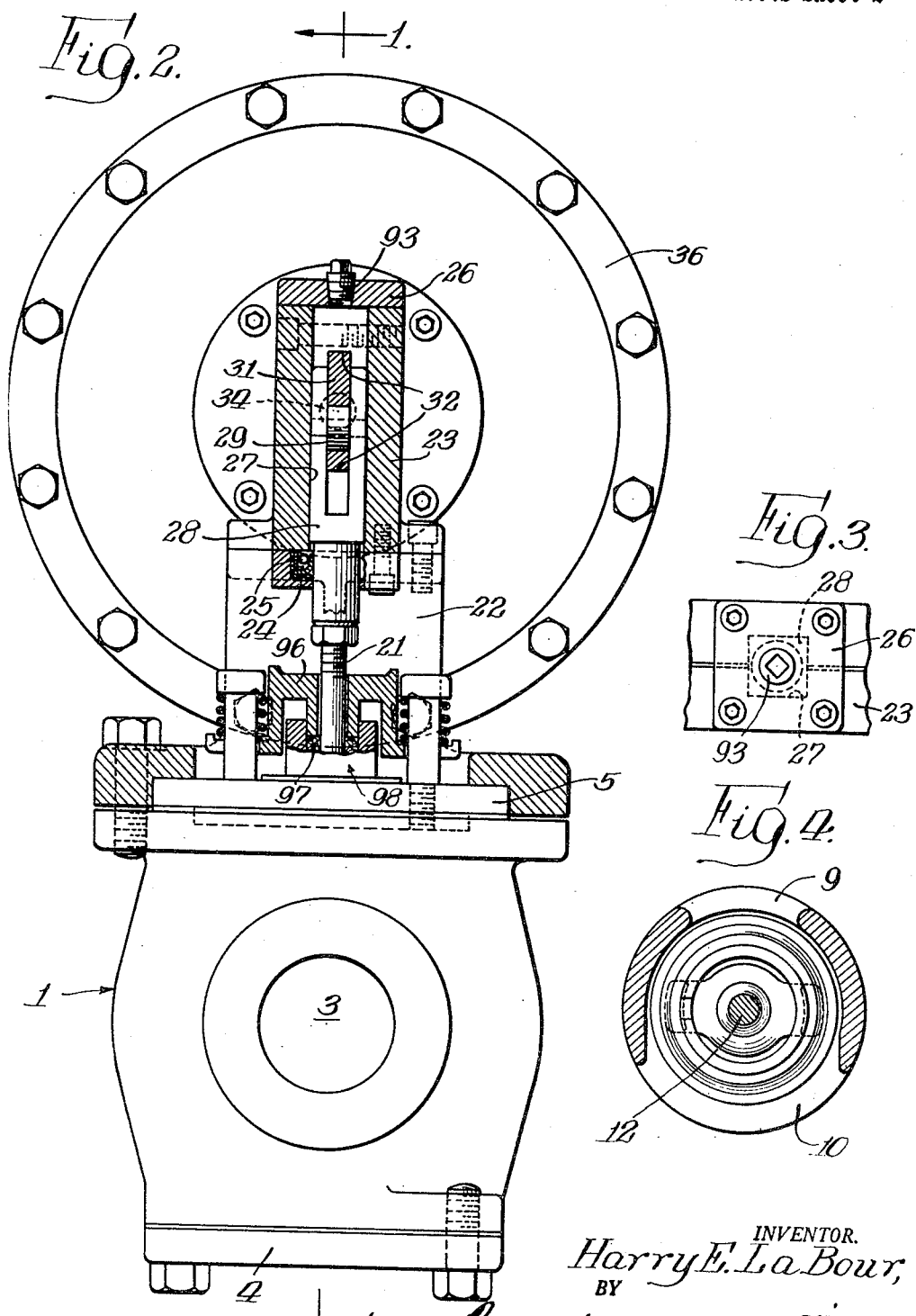
INVENTOR.
Harry E. La Bour,
BY
Attys.

2,709,451
Patented May 31, 1955

1

2,709,451
BALANCED DUPLEX VALVE HEAD AND SEAT MEMBER

Harry E. La Bour, Elkhart, Ind.

Application July 26, 1952, Serial No. 301,054

4 Claims. (Cl. 137—625.35)

In my copending application, Serial No. 301,053 filed July 26, 1952, entitled Leakage Control for Centrifugal Pump Shaft Seals, I have disclosed a system and method of controlling the pressure on the inside of the shaft seal of a centrifugal pump by the use of a flow restriction in the intake passageway of the pump. By keeping the fluid pressure at the inner end of the shaft seal slightly below atmospheric pressure, which latter pressure prevails at the outer end of the shaft seal, no leakage of fluid will occur outwardly through the seal. For a more complete discussion of the problem of reducing or avoiding leakage at the pump shaft seal through the expedient of restricting inflow, and thereby producing a sub-atmospheric pressure at the eye of the impeller and in the inlet end of the pump casing, I refer to the above copending application.

I have found that for such a control system, particularly where the same is to be employed in chemical service, the requirements for a satisfactorily operating valve are not met by valves now available.

One particular difficulty resides in the tendency of valves of known construction to oscillate or hunt when used in this service. I have found that one of the reasons for such hunting lies in the lack of balanced pressures, both static and impact pressure. Another difficulty resides in the unpredictable factors of liquid or liquid and gas flow which produces unbalanced forces even upon a statically balanced valve. Gas entering or being released in the liquid being pumped produces unavoidable irregularities of flow and pressure.

The valve should be sensitive because of the desire for close regulation of the pressures involved, and the small pressure differentials available for actuation of the valve.

The valve member according to the present invention is a duplex balanced body which is made up of parts which may be easily constructed and assembled with the cooperating seat member which is easily constructed with fine accuracy and capable of ready assembly with the valve body and the valve housing.

The valve operating stem extends through a packing, the inner end of which is open to the controlled side of the valve, and hence subject only to the controlled pressure which in the system in which the valve is intended to be used is not greater than atmospheric.

For chemical service, the valve parts are required to be capable of embodiment in suitable corrosion resistant metal. This involves relatively rugged parts and simple castings. To make a balanced valve suitable for chemical service, i. e., to handle corrosive liquids, is a difficult undertaking. Alloys which resist corrosion are generally difficult to cast in thin sections or complex shapes because in many cases the molten metal is viscous and resists flow into restricted cavities of the mould. Also when solidified such metal generally has no great strength in tension. There is a tendency for the castings to warp because of the high shrinkage of alloys of this type upon cooling to solidification, particularly in shapes of nonuniform section or in unsymmetrical forms.

Machining of such metals is difficult and is to be avoided wherever possible. At the same time the nicety of control required in a valve for the service to which this valve is particularly applicable is optainable only if the two members are substantially accurately balanced. These two conflicting requirements, namely, first, the making of the valve out of rugged cast parts and relatively thick sections of corrosion resistant metal or alloy, and to provide for a minimum of machining, and, second, substantially accurate balance of the valve closures relative to each other, are not reconciled in the prior art.

In addition, the necessity for simplicity in the valve housing which is also to be made of the same corrosion resisting metal or alloy, and to which the aforesaid valve parts are to be fitted, has not been recognized in the prior art. According to the present invention, I provide a balanced spool valve made in two sections and assembled in a valve seat member which is formed in the shape of a cage. The assembled seat member and valve are introduced as a unit and removably mounted in the valve housing. Renewal of the valve and cage unit with new tight fitting valve and seat faces is thus readily accomplished. This is important in chemical service where the cooperating faces are subject to both mechanical wear and chemical attack.

The structure of the preferred form of valve and seating cage is unique in that the valve is made of relatively thick sections so that it may be readily constructed of corrosion resistant metal and will present considerable body against chemical attack, and at the same time, the connection of the parts of the valve to each other and the structure of the cage are such as to permit a maximum of free opening into, through, and out of the tubular bore of the valve.

Now in order to acquaint those skilled in the art with the manner of constructing and operating a device embodying my invention, I shall describe, in connection with the accompanying drawings, a specific embodiment of the same.

In the drawings:

Figure 1 is a longitudinal vertical section on the line 1—1 of Figure 2 through a valve embodying my invention;

Figure 2 is a left side elevation with parts broken away to reveal the cam and follower construction;

Figure 3 is a top plan view of the closure plate at the top of Figure 1; and

Figure 4 is a fragmentary cross section taken on the line 4—4 of Figure 1 to show the lateral opening for assembly of the parts of the valve body.

The specific design of valve shown in Figures 1 to 4 is intended to be suitable for use in chemical service, and as such, has certain specific advantages and requirements not necessarily involved in certain other applications of the invention herein claimed.

It is to be observed that in the preferred embodiment, the stuffing box of the control valve stem is located on the controlled side of the flow restricting valve, so that leakage at the same is prevented simultaneously with the prevention of leakage at the pump shaft seal. While the valve regulating diaphragm is preferably connected to the point of highest vacuum source in the pump casing, such as prevails at the eye of the impeller, it will generally be sufficient to connect the said diaphragm chamber to a point where there prevails a pressure representative of that prevailing upon the inner end of the pump shaft seal. This may be the intake passageway of the pump which is connected directly to outlet opening 3 of the valve. Hence, for simplicity of explanation, the diaphragm chamber opening 38 may be regarded as connected to the same pump inlet as the outlet passage 3.

The valve shown in Figures 1 to 4 comprises a valve body having an inlet 2 adapted to be connected to the liquid supply and an outlet 3 adapted to be connected to the inlet trap or passage of the pump where pressure corresponding to that on the inner end of the seal prevails. These connections are shown as adapted for flanged couplings, but obviously other forms of connections may be employed. The body 1 of the valve is provided with a bottom opening which is closed by a cover plate 4 and a top opening covered by a cover plate 5 which incorporates a stuffing box 98 for the cylindrical valve operating rod 21. The said stuffing box 98 may consist of a conventional gland having fibrous or like packing 97 compressed by the gland follower 96 of known construction. This packing for the rod 21 is on the pump side or controlled side of the valve, so that the subatmospheric pressure in the pump will protect this gland from outward leakage. The removable valve seat cage 6 is made in one piece, with two seats 7 and 8 of the same diameter, and with two or more lateral openings 9 and 10 between the seats. It is a casting made of a corrosion resistant metal machined to provide the desired valve seats and the finished flange and screw threads. As will be seen from Figure 4, the opening 10 is large enough to admit the entry laterally of the lower section 15 of the duplex valve. The assembled valve cage and valve as a unit is inserted through the top of the valve body before the placing of the cover 5, and is threaded into the opening in the web of the valve body 1.

The double or duplex valve is made in two pieces or sections to permit the conical faces being the same diameter slope and effective area. This is necessary for an accurately balanced valve. The valve is tubular, and is spool-shaped with a constricted tubular central portion having two heads with conical faces looking in the same direction. This valve is divided transversely into two sections. These sections are castings of corrosion resistant metal. The upper valve section 11 is connected to the bolt by a spider having multiple arms 13 and threaded hub or connection 14. Bolt or stem 12 at its lower end carries the lower valve section 15 which is assembled to the upper section and to stem 12 by inserting the lower section laterally through the opening 10 and engaging the parts at the piloted joint 16. The two sections are drawn into firm contact by the nut 17 on the lower end of stem 12. The lower valve section 15 has multiple openings 18 between suitable spider arms for the passage of liquid. The spider, consisting of the arms 13 and hub 14, extends from the upper rim of the upper valve section 11, and thereby permits ample outlet passageway opening from the inside of the tubular valve. Likewise, the arms 18 of the lower spider extend below the lower rim of the lower valve section 15 and thereby allow of the provision of relatively thick sections in the spider with ample passageway for liquid from inside the cage to the tubular opening lengthwise through the valve. By extending the spider arms in an axial direction, any desired amount of opening into the tubular passageway through the valve may be attained without restricting said passageway.

The bolt 12 has its upper end threaded into the hub of the upper section 11 and by means of a radial shoulder is arranged to be spaced at its upper end as at 19, slightly clear of the enlarged end or head 20 of the valve stem 21. This provides a small degree of freedom between the valve and the guided stem 21. The valve cage 6 has a depending cup for closing off the lower annular seat 8, and this cup provides room to receive the spider 18 and the fastening nut 17 which is threaded upon the lower end of the bolt 12, and provides the necessary communication for flow of liquid through the openings between the spider arms 18.

The operating mechanism for the balanced valve is attached to the valve housing through bracket 22, which at its upper end carries the cam housing 23, which is closed at its lower end by cover 24 equipped with the oil seal 25 for cooperation with plunger 28 which is round at its lower end. Cover 26, shown in Figure 3, closes the upper end of the bore or opening in the cam housing in which the square part of the plunger or roller carrier member 28 plays.

Cam housing 23 has a vertical bore or opening 27 between the upper and lower covers 26 and 24, and this opening 27 guides the roller carrier 28, which is attached to the stem 21 of the valve, and which roller carrier 28 is slotted and carries in the slot a cam roller 29 operating in the inclined slot 30 in the cross head member 31, which latter is formed as a slotted plate slides in the cross guide slot 32 in housing 23 and extends through the slot in the plunger 28. At the right hand end, as viewed in Figure 1, the cross head 31 is attached to a flexible diaphragm 33 through the medium of the round rod or stem 34, which stem extends through the oil seal 35.

While I have shown the cam slot or box cam as carried on a cross head having rectilinear motion, it will be apparent to those skilled in the art that the cam slot might be embodied in a swinging or pivoted cross head member without departure from the teaching of my invention. The action is, in either form, a cam action in which the diaphragm 33 has the mechanical advantage of an irreversible transmission.

Diaphragm 33 has its periphery clamped between the open housing member 36 and the closed cover or chamber member 37, which latter is provided with an inlet opening 38 for connection, as by a tubular connection or pipe to the highest vacuum source in the pump or to a point which has a pressure representative of the highest vacuum in the pump.

At the opposite end of cam housing 23, at the left as viewed in Figure 1, there is an opening 39 covered by a plate 40 which carries a tubular extension 95 enclosing the adjusting spring 41, and which tubular extension 95 is closed at its outer end by the threaded plug 42. The spring 41 is compressed between the bottom of the housing 40 and a head or anchor plate 94 carried at the outer end of the stem 43. The spring 41 is connected to the cross head 31 through the stem 43.

The cam housing 23 is filled or substantially filled with light oil through a filler opening plate 26, and is then sealed as by the plug 93 in the cover plate 26 shown in Figures 1 and 3.

The operation of the device is as follows: A tubular connection is run from opening 38 in the diaphragm chamber to the pump, preferably as near the pump seal as possible, but at least into the pump itself, that is, between the location of the present valve and the intake or eye of the impeller of the pump. The present valve is inserted in the suction line of the pump with the opening 3 towards the pump and the opening 2 connected to the source of supply.

When the pump is not in operation, the spring 41 acting through the cam and roller holds the duplex valve closed.

Now if the pump is started, it will tend to create suction on its intake side. As soon as sufficient predetermined vacuum has been built up on the diaphragm 33, it will overcome the spring spressure of the spring 41, and begin to open the valve. This admits liquid to satisfy the suction to the extent permitted by the valve opening under the control of the diaphragm 33. The operation of the valve to maintain the predetermined slight suction on the intake side of the pump is entirely automatic, regardless of the pressure on the inlet side of the valve. If the vacuum on the diaphragm 33 falls below the predetermined value, i. e., if the pressure rises above the predetermined minimum which is subatmospheric, the valve will close until the vacuum increases, and again opens the valve. If the pump is shut down, the spring will close the valve and hold it closed until vacuum again is present on the intake side of the pump effective upon the diaphragm 33.

In practice, it has been found that a vacuum as low as one inch of mercury will start to open the valve. The amount of opening required is of course controlled by the rate of flow through the valve, which is in turn a factor of the pressure differential through the valve.

If the liquid supply at the inlet 2 to the valve housing 1 is under vacuum, the valve stays open. If now the inlet condition changes to pressure, that is, above atmosphere, the valve will adjust its opening to maintain the full rate of flow under the new pressure conditions, always insuring, however, that the desired minimum vacuum condition effective upon the inner end of the pump seal is maintained. The valve functions smoothly and without surging. Pressure and flow of liquid or other medium upon the valve itself is designed to be balanced, and is not effective to shift the position of the valve relative to its seat or relative to the diaphragm. The slope of the cam 30 acting upon the roller 29 is preferably below the critical angle of friction, so that the cam locks the position of the valve stem while free to move it by variations in pressure upon the diaphragm 33. It is not strictly necessary to make the cam and roller self-locking, since the mechanical advantage which the diaphragm has over the valve plus the damping action which controls the cross head, tends to produce sufficient inertia and delay that surging or hunting of the valve does not occur, but such self-locking action is highly advantageous.

I do not intend to be limited to the specific details disclosed except as they are made essential by the limitations of the apepnded claims.

I claim:

1. In a valve of the class described, a valve housing having an inlet opening neck and an outlet opening neck, a diagonal web in the body between said inlet and outlet, said web having a central flat portion with a threaded opening therethrough, a duplex seat member having two seats of the same diameter, said member comprising a valve cage having a flanged ring threaded into said opening and, a cup suspended below the ring by a pair of webs which are spaced apart to permit the lateral entry of the lower portion of a cooperating duplex valve member, said ring and said cup having their upper inner edges faced off in parallel to form valve seats and having their inner walls machined to the same dimension to provide two spaced apart valve seats of the same diameter, a tubular duplex valve member in said valve cage, said duplex valve member having two coaxial similarly tapered valve faces joined by a hollow cylindrical wall, said valve member consisting of two sections having cylindrical portions facing each other and having means whereby they are piloted into axial alignment with each other, the lowermost section being laterally insertable inside said seat member through the space defined vertically between the ring and the cup and laterally between said webs, said valve sections having spiders at their opposite ends, and having a central bolt connecting said spiders and holding the sections together the spider of each valve section projecting axially beyond the end of the section and the lower spider and the adjacent end of the connecting bolt projecting into said cup.

2. In a valve of the class described, a valve housing having an inlet and an outlet and a diagonal dividing web therebetween, said web having a threaded opening to receive a threaded duplex seat member constituting a cage and a contained duplex valve member, said cage member having a ring portion threaded to fit said threaded opening, and a depending cup portion suspended from the ring portion by spaced integral webs, said ring and said cup providing seats of substantially the same diameter, said contained valve being a tubular body with conical valve faces pointing in the same direction, said conical valve faces being formed on heads on opposite ends of the tubular body, said valve being constructed of two portions having means whereby they are piloted together axially and having spiders integral with said heads, and a bolt connecting the two spiders and holding the two portions rigidly together, said lower portion of the valve being insertable into the inside of the seat member through the opening between the ring and the cup portions and between the two connecting webs for assembly of the valve inside the cage, the spider of said lower portion of the valve projecting beyond the lower end thereof and said spider and the lower end of the bolt being disposed in said cup.

3. A valve sub-assembly comprising an integral duplex seat member constituting a cage and comprising an upper ring portion and a suspended cup portion, and having two seats of substantially the same diameter, a spool shaped tubular valve member having heads providing duplex conical faces cooperating with said duplex seats for simultaneously opening or closing the openings through the seat member, said valve member comprising two sections having means whereby they are piloted together for endwise assembly, the lowermost section being insertable laterally into the seat member through an opening between the ring portion and the cup portion of said duplex seat member said heads having spiders and a bolt joining said spiders and holding the sections together as a unit, the lower spider and the adjacent end of the bolt projecting axially beyond the lower head and into the lower end of the cup to provide substantially free passageway between the spider arms and the inside of the tubular valve member.

4. In a valve for regulating or shutting off liquid flow, the combination of a valve housing having axially aligned inlet and outlet opening necks provided with inlet and outlet openings, a web extending from the top of one neck opening across the interior of the housing to the bottom of the other neck opening and having a central flat portion through which there is an opening, the axis of which is substantially at right angles to the axis of said neck openings, said valve housing having a top opening axially in alignment with the aforesaid opening through the web, and a closure plate for said latter opening, said plate having a packing gland, a valve operating rod extending through said gland to the interior of said housing, a unitary valve seat cage having two parallel spaced valve seats of substantially equal diameters, said seat cage comprising an upper ring exteriorly threaded and screwed into the threads of the opening in said web, and a cup member the rim of which is attached to the bottom of the ring by a pair of integral spaced web members, the upper edges of the ring and cup being faced off to provide said valve seats, a tubular duplex valve having two parallel similarly tapered valve faces cooperating with said valve seats, said valve comprising two sections having substantially cylindrical portions axially facing each other and having means whereby they are piloted into axial alignment, said sections each having a spider with a central hub, a connecting bolt, said upper hub being joined to the lower hub by said connecting bolt and having a socket providing part of a flexible coupling to the lower end of the aforesaid operating rod, the lower section of the valve being insertable into the cage through the opening defined vertically between the ring and the cup and laterally between the said pair of web members, the lower spider and the adjacent end of the bolt projecting below the lower valve seat and extending into said cup.

References Cited in the file of this patent

UNITED STATES PATENTS

| 862,130 | Bonte | Aug. 6, 1907 |
| 1,126,537 | Lockyer | Jan. 26, 1915 |
| 1,299,130 | Cockburn | Apr. 1, 1919 |
| 1,860,468 | MacLean | May 31, 1932 |
| 2,290,527 | Bergtholdt | July 21, 1942 |

FOREIGN PATENTS

| 20,966 | Switzerland | Feb. 10, 1900 |
| 31,486 | Austria | 1908 |
| 637,534 | Germany | Oct. 30, 1936 |